United States Patent [19]
Mochizuki et al.

[11] Patent Number: 4,720,162
[45] Date of Patent: Jan. 19, 1988

[54] DEVICE FOR SWITCHING FROM ONE LIGHT SOURCE TO ANOTHER

[75] Inventors: Kiyofumi Mochizuki; Hiroharu Wakabayashi; Yoshihori Namihira; Hideharu Tokiwa, all of Tokyo, Japan

[73] Assignee: Kokusai Denshin Denwa Kabushiki Kaisha, Tokyo, Japan

[21] Appl. No.: 850,453

[22] Filed: Apr. 11, 1986

Related U.S. Application Data

[63] Continuation-in-part of Ser. No. 710,958, Mar. 14, 1985, abandoned, which is a continuation of Ser. No. 373,562, Apr. 30, 1982, abandoned.

[30] Foreign Application Priority Data

May 11, 1981 [JP] Japan .................. 56-069419

[51] Int. Cl.⁴ .................................................. G02B 6/26
[52] U.S. Cl. ............................. 350/96.15; 350/96.18; 350/96.10; 350/370
[58] Field of Search ............ 350/96.15, 96.16, 96.18, 350/96.19, 360, 370

[56] References Cited

U.S. PATENT DOCUMENTS

| | | | |
|---|---|---|---|
| 3,977,764 | 8/1976 | d'Auria et al. | 350/96.18 X |
| 4,341,442 | 7/1982 | Johnson | 350/96.30 |
| 4,412,720 | 11/1983 | Costa | 350/96.18 |

FOREIGN PATENT DOCUMENTS

| | | |
|---|---|---|
| 5318968 | 9/1968 | Japan . |
| 53-67449 | 6/1978 | Japan . |
| 54-130044 | 1/1979 | Japan . |

OTHER PUBLICATIONS

"Data Highway Using Optical Fiber Cable" by Ueno et al., Conference on Laser & Elect. Optical System, pp. 78-79, Mar. 1971.

Primary Examiner—William L. Sikes
Assistant Examiner—Akm E. Ullah
Attorney, Agent, or Firm—Pollock, Vande Sande and Priddy

[57] ABSTRACT

An optical coupler is formed of at least one polarization maintaining single mode fiber, a polarizing beam splitter connected to the polarization maintaining single mode fiber, and a main optical fiber which is connected with the polarizing beam splitter at one end thereof. This optical coupler is useful as a changeover switch for a light source.

8 Claims, 13 Drawing Figures

DEVICE FOR SWITCHING FROM ONE LIGHT SOURCE TO ANOTHER

CROSS-REFERENCE TO RELATED APPLICATION

This is a continuation-in-part of application Ser. No. 06/710,958, filed Mar. 14, 1985, now abandoned which is a continuation of application Ser. No. 06/313,562, filed Apr. 30, 1982, now abandoned.

BACKGROUND OF THE INVENTION

1. Field of the Invention:

This invention relates to an optical coupler of low insertion loss for use in the field of optical communication to switch from one light source to another without the slightest interruption.

2. Description of the Prior Art:

Semiconductor lasers available today as light sources for optical communications are deficient in reliability as compared with semiconductor elements. In the field of optical communications which requires high reliability, therefore, improvements in and concerning the reliability of such semiconductor lasers have been strongly in demand.

As a tentative measure to heighten the reliability of light sources for optical communications, adoption of a redundant construction in which two semiconductor lasers are alternatively put to use, one as an operating light source and the other as a stand by light source, has been conceived. To render this redundant construction practicable, there has been heretofore used a change-over switch constructed as illustrated in FIG. 1 for the purpose of enabling the operating light source to be switched to the standby light source.

This switch is formed of a movable prism 5. When the light signal emitted from a light source 1 and propagated through a fiber 3 is desired to be led to the main optical fiber 6, the movable prism 5 is moved to the upper position indicated by a dotted line. When the light signal emitted from a light source 2 and propagated through a fiber 4 is desired to be led to the main optical fiber 6, the movable prism 5 is moved to the lower position indicated by a continuous line. In this manner, the light signal from the light source 1 and that from the light source 2 are switched from one to the other by the switch which is formed of the movable prism 5.

This switch has features of low level in cross-talk. It nevertheless has a disadvantage that both reproducibility and reliability of the switching effected thereby are deficient because the prism is mechanically moved and, therefore, is susceptible of positional deviation.

SUMMARY OF THE INVENTION

An object of this invention is to provide a device for switching from one light source to another with an optical coupler of low insertion loss which effects the switching with good reproducibility and reliability, enables two beams of light to be switched from one to the other without the slightest interruption, and thereby proves useful for an optical communication system.

DETAILED DESCRIPTION OF THE INVENTION

The light waves which are propagated through optical fibers currently used in optical communication systems have their conditions of polarization at the outlet end of the optical fiber changed by thermal changes or physical flexures of the optical fiber. Recently, a polarization maintaining single mode fiber has been developed in which the light waves in propagation therethrough are sparingly affected by such external factors and the conditions of polarization at the outlet end in normal state can be maintained in the form of linear polarizations. This invention uses such a polarization maintaining single mode fiber. The principle of this invention will be explained below.

Figure 1:
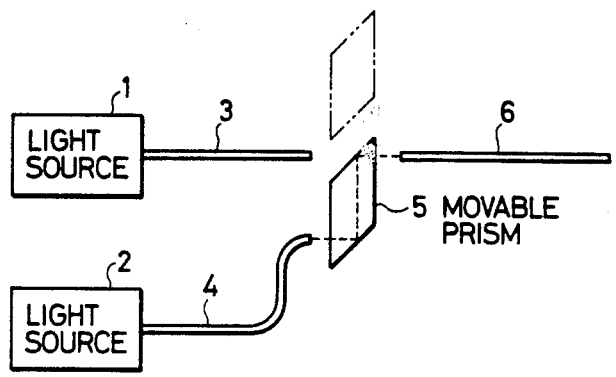
FIG. 1 is a schematic diagram of a conventional optical changeover switch.
Figure 2:
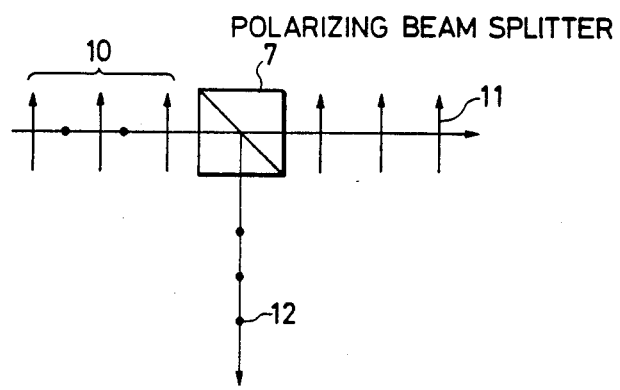
FIG. 2 and FIG. 3 are explanatory diagrams illustrating the operation of the embodiment of this invention.
Figure 3:
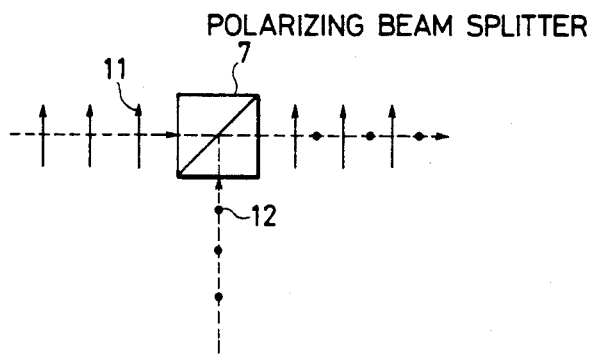

FIGS. 2 and 3 are diagrams for explaining the principle of the present invention wherein FIG. 2 is a diagram illustrating a situation in the case where an input light wave 10 composed of P polarized light waves 11 and S polarized light waves 12, being linearly polarized light waves crossed perpendicularly to each other, is separated by a polarizing beam splitter 7, and from which it is understood that the input light wave 10 is separated into the P and S polarized light waves 11 and 12, respectively, by means of the polarizing beam splitter 7.

FIG. 3 is a diagram contrary to the case of FIG. 2 where the P polarized light waves 11 are synthesized with the S polarized light waves 12 by means of the polarized beam splitter 7 in which such polarized light waves crossed perpendicularly to each other can be synthesized at low loss by means of the polarizing beam splitter 7. According to the present invention, such synthesizing means is applied to a light source switching device wherein either of the light waves of the polarized light waves crossed perpendicularly to each other are used as an operating light source, while the other light waves are utilized as a standby light source.

Embodiment of the present invention will be described in detail hereinbelow.

EMBODIMENT 1

Figure 4A:
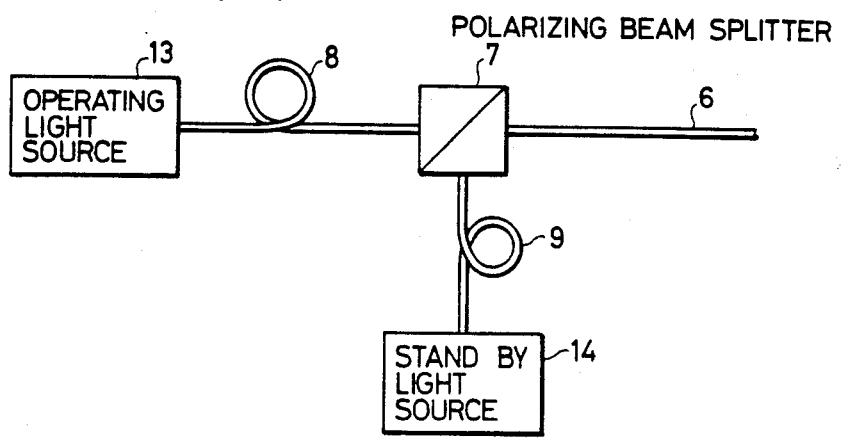
FIG. 4A is a schematic diagram of one embodiment of the present invention.

FIG. 4A is a schematic view showing an example of the light source switching device according to the present invention in the case where switching information for the operating and standby light sources is obtained, for example, from its reception side, and a light source is manually switched over on the transmission (light source) side.

In the drawing, the light waves guided by the polarization maintaining single mode fiber 8 are polarized into P polarized light, for example, and the light waves guided by the polarization maintaining single mode fiber 9 are polarized into S polarized light, for example. In the normal state, only the operating light source 13 is in operation. Only the light waves emitting from the operating light source 13, therefore, are led to the main optical fiber 6. Switching of the operating light source to the standby light source is effected by first turning on the standby light source 14 and subsequently turning off the operating light source 13. As the result, only the light waves emitting from the standby light source 14 are allowed to be led to the main optical fiber 6.

In accordance with the present application, since the switching of the operating light source 13 to the standby light source 14 can be accomplished simply by the ON-OFF control of the operating light source 13 and the standby light source 14, the operating light source 13 can be switched to the standby light source 14 without the slightest interruption, and at low loss.

Figure 4B:
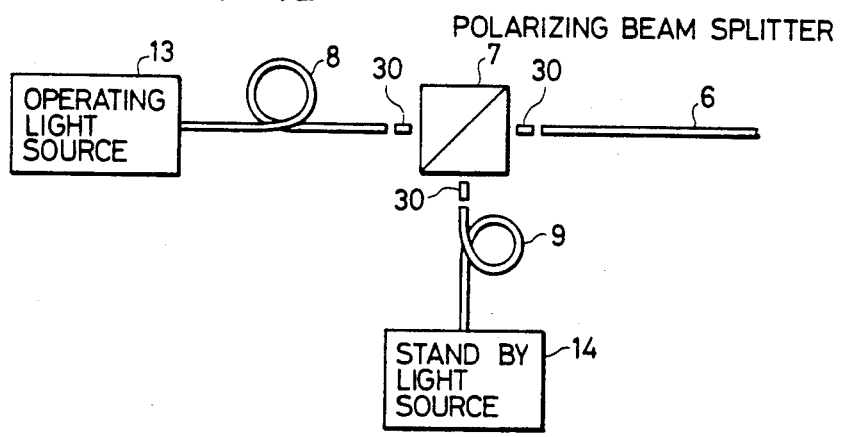
FIG. 4B is a schematic diagram of the embodiment shown in FIG. 4A, using self-focusing lenses.
Figure 4C:
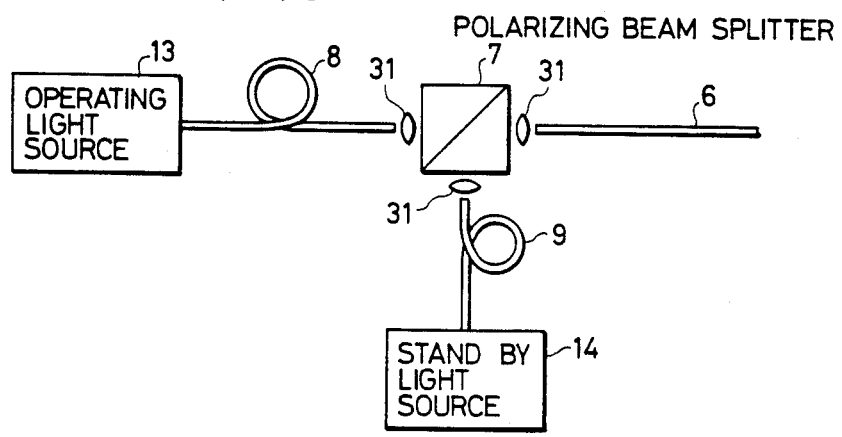
FIG. 4C is a schematic diagram of the embodiment shown in FIG. 4A using spherical lenses.

FIGS. 4B and 4C are schematic views each showing an improved light source switching device of the type shown in FIG. 4A. Self-focusing lenses 30 are disposed between the polarization maintaining single mode fibers 8, 9 and the polarizing beam splitter 7 as well as between a main track optical fiber 6 and the polarizing beam splitter 7, respectively, in FIG. 4B, while spherical lenses 31 are sandwiched between the polarization maintaining single mode fibers 8, 9 and the polarizing beam splitter 7 as well as between a main track optical fiber 6 and the polarizing beam splitter 7, respectively, in FIG. 4C, whereby light waves are efficiently introduced.

In said embodiments illustrated in FIGS. 4A-4C, two light sources 13 and 14 oscillating linear polarized light waves may be arranged either so that they are disposed in a manner where the angle of the directions along which both the light beams are emitted becomes 90°, and P and S waves emitted from said light sources are introduced into the polarization maintaining single mode fibers 8 and 9, respectively, to lead them to the beam splitter 7 in such a situation where the plane of polarization of light is maintained, or so that said two light sources oscillating linear polarized light waves are oriented in the same direction. The linear polarized light waves emitted from said light sources are introduced into the polarization maintaining single mode fibers 8 and 9, and either single polarization optical fiber is twisted at an angle of 90° with respect to the other single polarization optical fiber, whereby S and P waves are obtained in the plane of incidence of the beam splitter 7, i.e., the emission end of the polarization maintaining single mode fibers.

Figure 5:
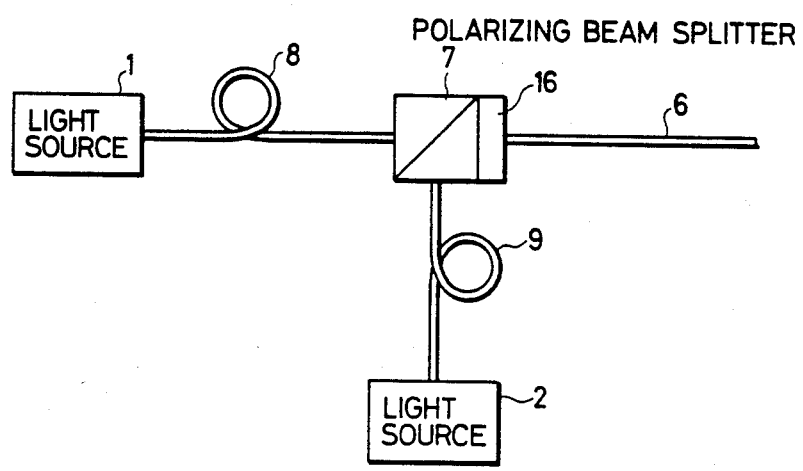
FIG. 5 is a schematic diagram of another embodiment of the present invention.

Furthermore, as shown in FIG. 5, a quarter-wave plate 16 can be inserted into a gap defined between the polarizing beam splitter 7 and the main track optical fiber 6, whereby a manually switchable light source switching device which may reduce influence of the reflected light from the main track optical fiber 6 upon the light sources 1 and 2 may also be constructed.

Figure 6:
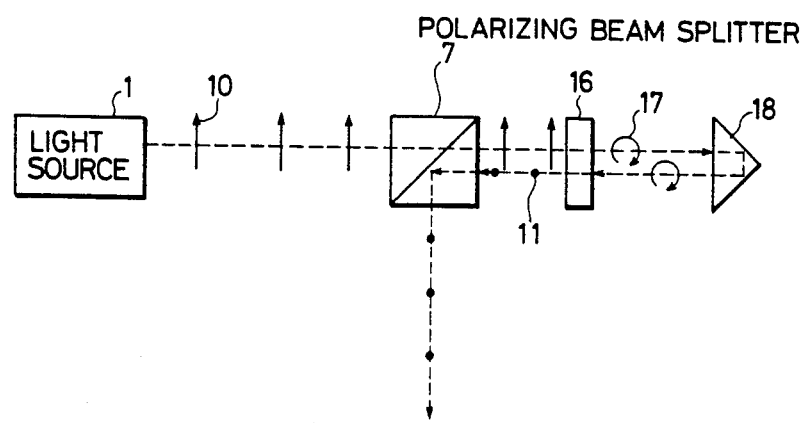
FIG. 6 is an explanatory diagram illustrating the operation of the embodiment of FIG. 5.

The principle underlying the FIG. 5 embodiment will be described below with reference to the equivalent diagram of FIG. 6. The P polarized light waves 10 emitting from the light source 1 penetrate through the polarizing beam splitter 7 and then pass through the quarter-wave plate 16 having the axis thereof inclined by 45° relative to the axis of P polarization. Consequently, the P polarized light waves are converted into circularly polarized light waves 17. When the circularly polarized light waves 17 are reflected by the prism 18, returned, and passed through the quarter-wave plate 16 again, they are converted into S polarized light waves 11. The S polarized light waves 11 are reflected by the polarizing beam splitter 7 and are prevented from propagating toward the light source 1. The undesirable effect of the reflected light upon the light source 1, therefore, can be avoided.

Owing to the principle described above, when in the configuration of FIG. 5, the light source 1 alone is in the ON state, the reflected light coming back through the main optical fiber which is a part of the light emitted from the light source 1 is propagated in the direction of the light source 2 and, therefore, is prevented from inflicting an effect upon the light source 1. At this time, since the light source 2 is in the OFF state, the reflected light has no effect whatever upon the light source 2.

Conversely when the light source 2 is in the ON state and the light source 1 is in the OFF state, since the reflected light coming back through the main optical fiber 6 which is a part of the light emitted from the light source 2 is caused to propagate in the direction of the light source 1, the otherwise possible adverse effect upon the light source 2 can be avoided.

EMBODIMENT 2

Figure 7:
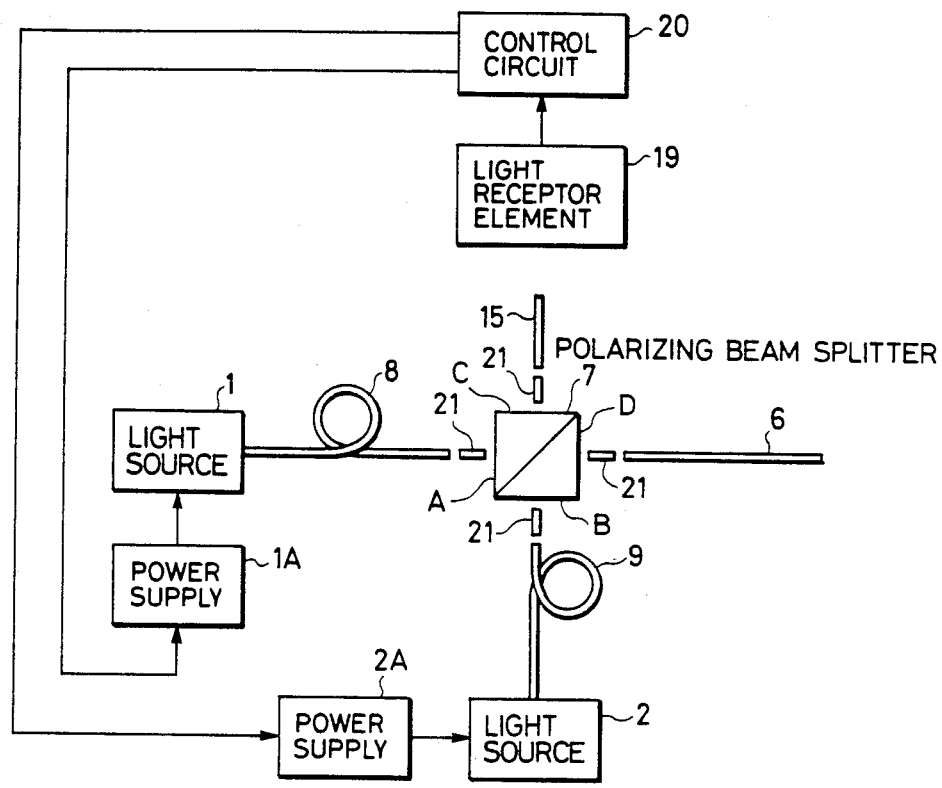
FIG. 7 is a block diagram of a further embodiment of the present invention.

FIG. 7 is a constructional diagram illustrating another embodiment of the automatic light source switching device according to the present invention wherein reference numeral 1 designates a light source for P polarized light waves, 1A is a power supply for supplying electric current to the operating light source 1, 2 is a light source for S polarized light waves, 2A is a power supply for supplying electric current to the standby light source 2, 6 is a main track optical fiber, 7 is a polarizing beam splitter having four planes A, B, C, and D, 8 and 9 are each polarization maintaining single mode fibers maintaining a plane of polarization of the P and S polarized light waves, 15 is a conventional monitor optical fiber, 19 is a light receptor element for detecting monitor light, 20 is a control circuit for detecting the output level of the light receptor element 19 to turn ON-OFF the light source 1 or 2, and 21 are either self-focusing or spherical lenses etc. for introducing efficiently light waves disposed between the polarization maintaining single mode fibers 8, 9 and the polarizing beam splitter 7 as well as between the optical fibers 6, 15 and the polarizing beam splitter 7, respectively.

Here, the axes of polarization of polarization maintaining single mode fibers 8 and 9 at the ends thereof connected to end faces A and B respectively are slightly deviated from the axis of P polarization and the axis of S polarization of the polarizing beam splitter 7, so that a small detectable part of the waves emitting from the light source 1 and the light source 2 connected to the opposite ends of fibers 8 and 9 respectively may find their way via end face C of beam splitter 7 into the optical fiber 15. Said deviation is attained easily by a small rotation of the polarization maintaining single mode fiber about its own axis.

An example of the operation of the FIG. 7 embodiment, where the light source 1 is in its ON state and is utilized as the operating light source, while the light source 2 in an OFF state and is used as the standby light source, will be described hereinbelow.

The P polarized light waves emitted from the light source 1 propagate through the polarization maintaining single mode fiber 8 to be efficiently introduced into the plane A of the polarizing beam splitter 7 via the lens 21, and then the light waves emerging from the plane D of the polarizing beam splitter 7 enter into the main track optical fiber 6 through the lens 21. In this case, as mentioned above, since the axis of polarization of the polarization maintaining single mode fiber 8 is slightly inclined or deviated with respect to axis of P polarization in the polarizing beam splitter 7, weak light emerging from the plane C of the polarizing beam splitter 7 may be used for monitoring the light sources. The weak monitor light emerging from plane C enters into the light receptor element 19 through the lens 21 and the monitor optical fiber 15, is photoelectrically converted in the light receptor element 19 to obtain an electrical signal, and then said electrical signal is supplied to the control circuit 20.

Figure 8:
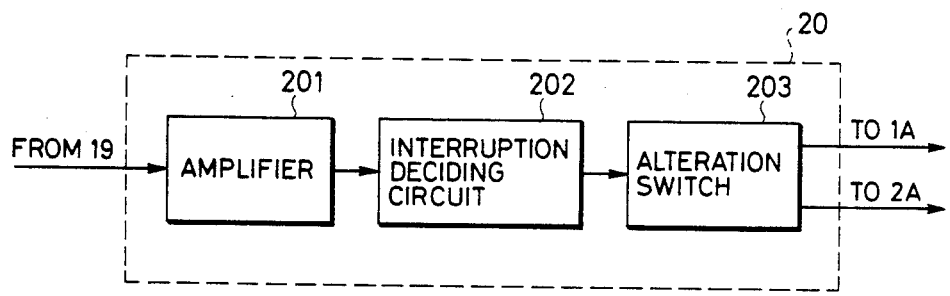
FIG. 8 is a block diagram illustrating an exemplification of the control circuit of FIG. 7.

In the control circuit 20, as shown in FIG. 8, the signal is amplified by an amplifier 201, and then it is decided whether the operating light source 1 is interrupted by means of an interruption deciding circuit 202. For example, it is decided that the operating light source is interrupted at the time when it is 3 dB lower than a predetermined reference level. The interruption information is transmitted to an alteration switch 203 provided with two relays containing a built-in holding circuit. Said alteration switch 203 operates so as to alternately switch terminals at every interruption to transmit information or the like to (e.g. to ground) the power supply 1A or 2A, whereby the power supply 1A or 2A is automatically turned ON-OFF.

Figure 9:
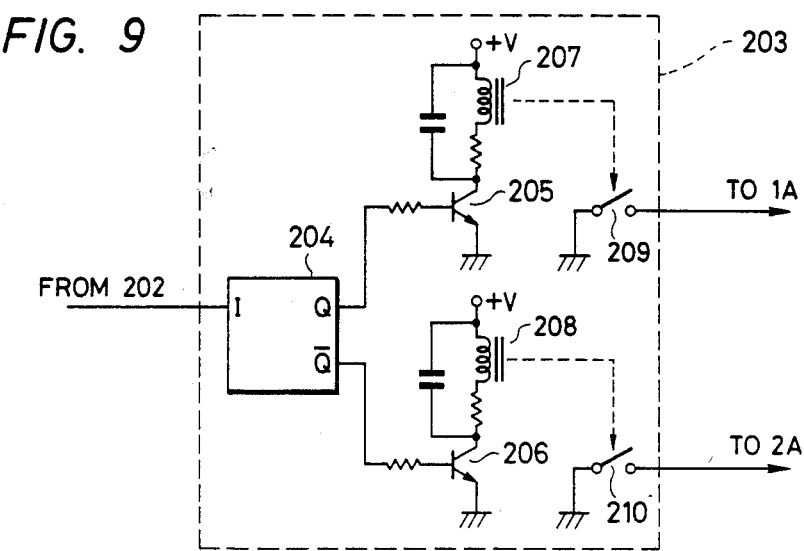
FIG. 9 is a circuit diagram illustrating an exemplification of the alteration switch of FIG. 8.

FIG. 9 shows an embodiment of the alteration switch 203. This alteration switch 203 is formed of a flip-flop circuit 204, two switching transistors 205, 206 connected with the Q and $\overline{Q}$ output terminals of the flip-flop circuit 204 respectively, two relays 207, 208 with a holding circuit connected between a power supply +V and the switching transistors 205, 206 respectively, and switches 209, 210 turned ON-OFF by the relays 207, 208 respectively.

In the alteration switch 203, the interruption information generated in the interruption deciding circuit 202 inputs into the flip-flop circuit 204, and then the signal levels of the Q, $\overline{Q}$ outputs change from one to the other and the respective operating states of relays 207, 208 are reversed.

As each relay 207 and 208 has a holding circuit, they are not turned OFF immediately but only after a predetermined time. On the contrary they are immediately turned ON. So, both switches 209 and 210 are in an ON state simultaneously for the predetermined time when they are switched from one state to another.

As an example, the following steps occur when switching over from the light source 1 to the light source 2:

(1) The signal level generated by the (operating) light source 1 becomes lower by 3 dB than the reference level.

(2) Ground information is transmitted to the power supply 2A via the alteration switch 203 from the interruption deciding circuit 202.

(3) The power supply 2A changes from OFF state to ON state.

(4) Electric current is begun to be supplied to the (standby) light source 2 so that S polarized light waves are emitted from the light source 2.

(5) The decreased level of P polarized light waves derived from the light source 1 and the S polarized light waves derived from the light source 2 overlap each other and are introduced into the main track optical fiber 6. However, since the main track optical fiber 6 is not a polarization maintaining single mode fiber, the plane of polarization of the P and S polarized light waves turns to random light, and the P and S polarized light waves only propagate slightly through the optical fiber 6.

(6) Since the alteration switch 203 contains holding circuits of about 1 ms, ground information directing to the power supply 1A is interrupted a lapse of 10 ms, so that the power supply 1A turns from ON state to OFF state thereby completing the switching thereof. In this case, a period of time may arbitrarily be preset for the holding circuit.

As described above, in accordance with the present invention, there is no need to switch the polarizing beam splitter 7, or the polarization maintaining single mode fibers 8, 9 and the like, by means of mechanical movement therefor or the like, and the light sources can be switched over without any interruption, so that a light source switching device of very low loss and high reliability can be obtained.

Next, the amount of inclination of the single polarization optical fibers 8 and 9 will be described.

Figure 10:
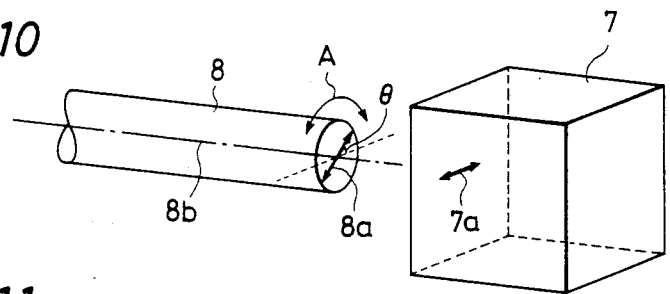
FIG. 10 is a schematic view illustrating the inclination angle $\theta$ between the axis of polarization of a polarization maintaining single mode fiber and the axis of P polarization of a polarizing beam splitter.

FIG. 10 is a schematic view illustrating the inclination angle $\theta$ between the axis 8a of polarization of polarization maintaining single mode fiber 8 and the axis 7a of P polarization of a polarizing beam splitter 7. The inclination angle $\theta$ changes when the polarization maintaining single mode fiber 8 is rotated about its own axis 8b as shown by arrow A.

Figure 11:
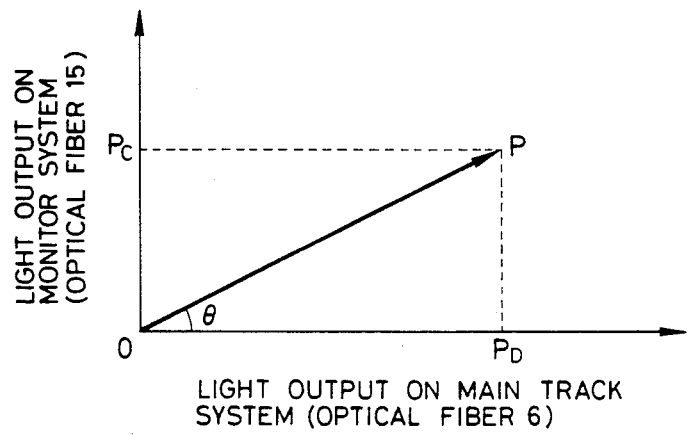
FIG. 11 is a graphical diagram illustrating a relationship between the inclination angle $\theta$ of the axis of polarization of the polarization maintaining single mode fiber and the light emitted from the polarizing beam splitter.

FIG. 11 is a graphical representation showing the relationship between the inclination angle $\theta$ of axis of the polarization of the polarization maintaining single mode fibers 8 and 9 and the light emitted from the end surface C (monitor light) or the end surface D (main track light) of the polarizing beam splitter 7. Assuming that the output power of the light sources 1 and 2 is P, and the inclination of the axis of polarization of the polarization maintaining single mode fibers 8 and 9 is $\theta$, the power $P_D$ of the light emitted from the end surface D of the polarizing beam splitter 7 may be expressed as follows:

$$P_D = P \cos^2 \theta \quad (1).$$

On the other hand, the power $P_C$ of the light emitted from the end surface C of the polarizing beam splitter 7 is expressed as follows:

$$P_C = P \sin^2 \theta \quad (2).$$

As a result, the smaller the inclination $\theta$ of axis of polarization, the larger the power $P_D$ of the light entering into the main track optical fiber 6, and the smaller the power $P_C$ of the light entering into the monitor optical fiber 15.

In the above case, it is required that the light receptor element 19 have a minimum sensitivity level, and that monitor light having a higher level than said minimum sensitivity level be supplied to the monitor optical fiber 15. In this connection, it is necessary to set the inclination angle θ of said axis of polarization in relation to the output power of said light sources 1 and 2, because the monitor light introduced through said monitor optical fiber 15 varies dependent upon the output power of the light sources 1 and 2. Furthermore, since the minimum sensitivity level of different individual light receptor elements 19 differ from one another, it is also required that said inclination angle θ of the axis of polarization be changed in response to such different levels.

Thus, when a light source switching device is constructed, the angles of the axis of polarization of the single polarization optical fibers 8 and 9 are manually adjusted so as to be detectable by means of the light receptor element 19, and then fixed at their adjusted angles.

In this case, the lens 21 is inserted for improving coupling efficiency, and in this connection, adjustment for angle is not necessary.

While a polarization maintaining single mode fiber can be used as the monitor optical fiber 15, with the plane of polarization being detected by the light receptor element 19, an ordinary optical fiber is utilized in the FIG. 7 embodiment to detect only the level thereof irrespective of the plane of polarization, a switch of the alteration switch 203 is initially connected to the side of the power supply 1A, and then the side of the power supply 2A is connected when interrupting information is supplied by the interruption deciding circuit 202.

In accordance with the present invention, combination or separation of input beams can be accomplished with low loss because the optical coupler is formed by using polarization maintaining single mode fibers and a polarizing beam splitter. When this invention is utilized in the standby light source circuit of an optical communication system, the switching of the operating light source to the standby light source can be effected by the ON-OFF control of the light sources. Since no mechanical motion is involved, the switching between the two light sources can be carried out with high reliability. The otherwise possible instantaneous interruption of the system can be avoided by this invention.

What is claimed is:

1. A light switching device for switching from one light source to another, comprising first and second light sources for emitting linear polarized light waves; first and second polarization maintaining single mode fibers each having an input end disposed adjacent a respective one of said light sources so that light beams output from said light sources enter into said fibers respectively, said fibers being so disposed relative to said light sources that the polarization axis of each of said fibers is substantially parallel to the polarization axis of the light waves incident on said fiber from its associated light source; a main track optical fiber for propagating said light beams output from both of said light sources; and a polarizing beam splitter disposed between the output ends of said first and second polarization maintaining single mode fibers and the input end of said main track optical fiber; said first and second polarization maintaining single mode fibers being operative to transmitting said light beams with the planes of polarization of said light beams being respectively maintained and with horizontal polarized light waves P and vertical polarized light waves S crossed perpendicularly to each other being emitted from the output ends of said optical fibers; said polarizing beam splitter having four planes the planes of incidence of which differ from the planes of emission thereof in dependence on the planes of polarization of the light beams that are output from said optical fibers; said polarization maintaining single mode fibers being so oriented to the respective planes of said polarizing beam splitter that some of the horizontal polarized light waves P and vertical polarized light waves S output from said optical fibers emerge simultaneously from the same plane of said polarizing beam splitter as emission light, one of said light sources being normally used as an ON operating light source and the other of said light sources being normally used as an OFF standby light source; and means responsive to the magnitude of said emission light from said same plane for controlling the ON-OFF states of said operating and standby light sources.

2. The light switching device of claim 1 wherein lenses for collecting light are disposed between the output ends of said polarization maintaining single mode fibers and said polarizing beam splitter as well as between said polarizing beam splitter and the input end of said main track optical fiber.

3. The light switching device of claim 1 wherein a λ/4 wave plate is disposed between said polarizing beam splitter and said main track optical fiber for preventing reflected light returning through said main track optical fiber from entering said operating light source.

4. The light switching device of claim 1 wherein the polarizations of said first and second light sources are oriented in the same direction, at least one of said first and second polarization maintaining single mode fibers that transmit the light beams emitted from said light sources being so twisted that the axes of polarization at the output ends of said fibers are at an angle of 90° to one another.

5. The light switching device of claim 1 wherein the planes of polarization of light emitted by said first and second light sources are disposed at an angle of 90° to one another, said first and second polarization maintaining single mode fibers transmitting the light beams emitted from said light sources being so arranged that the light beams input to said fibers are led to the light output ends of said fibers while maintaining the planes of polarization of said input light beams.

6. A light switching device for switching from one light source to another, comprising a polarizing beam splitter provided with four end faces A, B, C and D; first, second, third and fourth optical fibers coupled respectively to said end faces A, B, C and D, said polarizing beam splitter being operative to issue through said end face D both a polarizing wave P which is fed into said beam splitter through said end face A and a polarizing wave S which is fed into said beam splitter through said end face B; said first optical fiber being a polarization maintaining single mode fiber having one end thereof optically coupled to said end face A of said polarizing beam splitter with the axis of polarization of said one end of said first fiber being deviated from the polarizing axis of said polarizing beam splitter at an angle sufficient to leak a detectable amount of light via said beam splitter from said first optical fiber to said end face C, and said second optical fiber also being a polarization maintaining single mode fiber having one end thereof optically coupled to said end face B of said polarizing beam splitter with the axis of polarization of said one end of said second fiber being deviated from the polarizing axis of said polarizing beam splitter at an angle sufficient to leak a detectable amount of light via said beam splitter from said second optical fiber to said end face C; a first light source operative to generate polarizing light P, said first light source being connected to a second end of said first polarization maintaining single mode fiber at a location remote from end face A of said polarizing beam splitter, a second light source operative to generate polarizing light S, said second light source being connected to a second end of said second polarization maintaining single mode fiber at a location remote from end face B of said polarizing beam splitter; and switching means responsive to the turning on of either selected one of said first and second light sources for turning off the other of said light sources without the slightest interruption, said switching means including said third optical fiber having one end thereof optically coupled to said end face C of said polarizing beam splitter for transmitting the said detectable amount of the polarizing light P and polarizing light S from the one of said first and second light sources respectively that is turned on thereby to monitor the operation of the said one of said first and second light sources that is turned on; said fourth optical fiber having one end thereof optically coupled to the end face D of said polarizing beam splitter for transmitting output light via said beam splitter from the one of said first and second light sources that is turned on.

7. The light switching device of claim 6 wherein at least one lens is inserted between each of said polarization maintaining single mode fibers and the polarizing beam splitter.

8. The light switching device of claim 6 or claim 7 wherein one of said first and second light sources is an operating light source and the other of said light sources is a standby light source.

* * * * *